United States Patent
Pasupathy et al.

(10) Patent No.: US 10,250,466 B2
(45) Date of Patent: Apr. 2, 2019

(54) APPLICATION SIGNATURE GENERATION AND DISTRIBUTION

(71) Applicant: Juniper Networks, Inc., Sunnyvale, CA (US)

(72) Inventors: Thyagarajan S. Pasupathy, Bangalore (IN); Venkata Rama Raju Manthena, San Ramon, CA (US); Rajeev Chaubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 286 days.

(21) Appl. No.: 15/083,693

(22) Filed: Mar. 29, 2016

(65) Prior Publication Data

US 2017/0288987 A1  Oct. 5, 2017

(51) Int. Cl.
*G06F 15/173*  (2006.01)
*H04L 12/26*  (2006.01)
(Continued)

(52) U.S. Cl.
CPC ...... *H04L 43/028* (2013.01); *G06F 17/30864* (2013.01); *H04L 29/06* (2013.01);
(Continued)

(58) Field of Classification Search
None
See application file for complete search history.

(56) References Cited

U.S. PATENT DOCUMENTS 6,760,752 B1 * 7/2004 Liu ............ H04L 63/0428
709/206
7,424,744 B1    9/2008 Wu et al.
(Continued)

FOREIGN PATENT DOCUMENTS

EP    2472786    4/2012

OTHER PUBLICATIONS

Goss et al., "Automated Network Application Classification: A Competitive Learning Approach", IEEE Symposium on Computational Intelligence for Communication Systems and Networks (CIComms), Apr. 2013, 7 pages, XP032478288.
(Continued)

*Primary Examiner* — Brian Whipple
*Assistant Examiner* — Gregory P Tolchinsky
(74) *Attorney, Agent, or Firm* — Harrity & Harrity, LLP

(57) ABSTRACT

A network device may receive network traffic for an application. The network device may identify an application layer protocol being used for the network traffic. The network device may obtain contextual information, from the network traffic, to obtain an item of contextual information, and the item of contextual information may be selected based on the application layer protocol. The network device may determine that the item of contextual information matches a stored item of contextual information. The network device may determine that a threshold has been met with regard to the stored item of contextual information. The network device may generate an application signature for the application based on the item of contextual information. The network device may send the application signature to another device to permit the other device to identify the application based on the application signature.

20 Claims, 8 Drawing Sheets

(51) Int. Cl.
    *G06F 17/30* (2006.01)
    *H04L 29/08* (2006.01)
    *H04L 29/06* (2006.01)
    *H04L 12/801* (2013.01)
(52) U.S. Cl.
    CPC .............. *H04L 43/00* (2013.01); *H04L 43/16* (2013.01); *H04L 47/10* (2013.01); *H04L 63/0227* (2013.01); *H04L 63/14* (2013.01); *H04L 63/1408* (2013.01); *H04L 67/02* (2013.01)

(56) References Cited

U.S. PATENT DOCUMENTS

| | | |
|---|---|---|
| 7,644,150 B1 | 1/2010 | Nucci et al. |
| 8,874,925 B1* | 10/2014 | Resurreccion ........ G06F 21/556 707/687 |
| 2006/0123480 A1* | 6/2006 | Oh ...................... H04L 63/1408 726/23 |
| 2009/0300153 A1 | 12/2009 | Ray et al. |
| 2010/0037062 A1* | 2/2010 | Carney ................. H04L 9/3247 713/176 |
| 2011/0219058 A1* | 9/2011 | Schmieder ............. G06F 12/00 709/203 |
| 2012/0204272 A1* | 8/2012 | Svensson ............... H04W 12/08 726/29 |
| 2013/0194930 A1 | 8/2013 | Szabo et al. |
| 2016/0057124 A1* | 2/2016 | Boyle ................. H04L 63/0861 726/7 |

OTHER PUBLICATIONS

Newsom et al., "Polygraph: Automatically Generating Signatures for Polymorphic Worms", 2005 IEEE Symposium on Oakland, May 2005, 15 pages, XP010798375.

* cited by examiner

APPLICATION SIGNATURE GENERATION AND DISTRIBUTION

BACKGROUND

Application identification may support network security and services, such as application-aware firewalls, application-aware traffic visibility and control, application-aware quality of service (QOS), application-aware rate limiting, application-based routing, or the like. Many applications are at or above layer 7 (L7), the application layer, of the Open Systems Interconnection model (OSI model). Applications may be identified based on deep packet inspection (DPI) of network traffic. DPI may identify known applications using application signatures that have been generated (e.g., by DPI vendors).

SUMMARY

According to some possible implementations, a network device may include one or more processors to receive network traffic for an application. The one or more processors may identify an application layer protocol being used for the network traffic. The one or more processors may obtain contextual information, from the network traffic, to obtain an item of contextual information, and the item of contextual information may be selected based on the application layer protocol. The one or more processors may determine that the item of contextual information matches a stored item of contextual information. The one or more processors may determine that a threshold has been met with regard to the stored item of contextual information. The one or more processors may generate an application signature for the application based on the item of contextual information. The one or more processors may send the application signature to another device to permit the other device to identify the application based on the application signature.

According to some possible implementations, a non-transitory computer-readable medium may store one or more instructions that, when executed by one or more processors, cause the one or more processors to receive network traffic associated with an application. The one or more instructions may cause the one or more processors to determine, from the network traffic, an application layer protocol being used for the network traffic. The one or more instructions may cause the one or more processors to obtain, from the network traffic, an item of contextual information, and the item of contextual information may be associated with the application layer protocol. The one or more instructions may cause the one or more processors to determine that the item of contextual information matches a stored item of contextual information. The one or more instructions may cause the one or more processors to determine that a threshold has been met with regard to the stored item of contextual information. The one or more instructions may cause the one or more processors to generate an application signature for the application based on the stored item of contextual information. The one or more instructions may cause the one or more processors to send the application signature to another device to permit the other device to identify the application based on the application signature.

According to some possible implementations, a method may include receiving, by a network device, network traffic, and the network traffic may correspond to an application. The method may include identifying, by the network device, an application layer protocol being used for the network traffic. The method may include obtaining, by the network device and from the network traffic, an item of contextual information, and the item of contextual information may be selected based on the application layer protocol. The method may include determining, by the network device, that the item of contextual information matches a stored item of contextual information. The method may include determining, by the network device, that a threshold has been met with regard to the stored item of contextual information. The method may include generating, by the network device and for the application, an application signature based on the item of contextual information. The method may include sending, by the network device, the application signature to another device to permit the other device to identify the application based on the application signature.

DETAILED DESCRIPTION

The following detailed description of example implementations refers to the accompanying drawings. The same reference numbers in different drawings may identify the same or similar elements.

If there is no application signature for an application, the application may be classified as an unknown application. Unknown applications may be rogue traffic, unidentified legitimate traffic (e.g., new applications as well as new versions of previously identified applications), traffic with a misconfigured application, or the like. Efficient and effective operation of application-aware security appliances may depend on reducing or minimizing the number of unknown applications that are identified on a network or system. However, new applications, and new versions of existing applications, may appear faster than application signature providers (e.g., DPI vendors) can generate and distribute application signatures. Furthermore, application signature providers (e.g., DPI vendors) may not be aware of network traffic that is being seen locally by various network devices. Implementations described herein may allow automated generation and distribution of application signatures, which may reduce the delay from identification of an unknown application to generation and distribution of an application signature to use for identifying the unknown application. Implementations described herein may also enable generation of application signatures, for locally popular applications (e.g., applications that may be associated with network traffic that is being seen locally by various network devices), before application signature providers even become aware of such applications.

Reducing delays in the generation and distribution of application signatures, and identifying locally popular applications, may improve the effectiveness of application-aware and/or application-based network security. Improving the effectiveness of application-aware and/or application-based network security may accelerate elimination of rogue traffic and/or identification of legitimate traffic, which may improve network security, conserve computing resources (e.g., processing resources and/or memory resources), and increase network performance (e.g., throughput and/or latency).

Some of the examples disclosed herein are based on the secure sockets layer (SSL) protocol. Although some implementations may use SSL, the examples disclosed herein may use any secure protocol, such as SSL, transport layer security (TLS), and/or other similar types of security measures. Additionally, some of the examples disclosed herein are based on the hypertext transfer protocol (HTTP). Although some implementations may use HTTP, the examples disclosed herein may use HTTP Secure (HTTPS) (e.g., HTTP over SSL or HTTP over TLS), such as where a network device may intercept secure traffic (e.g., where a server certificate is available or where the network device is acting as a forward proxy).

Figure 1A:
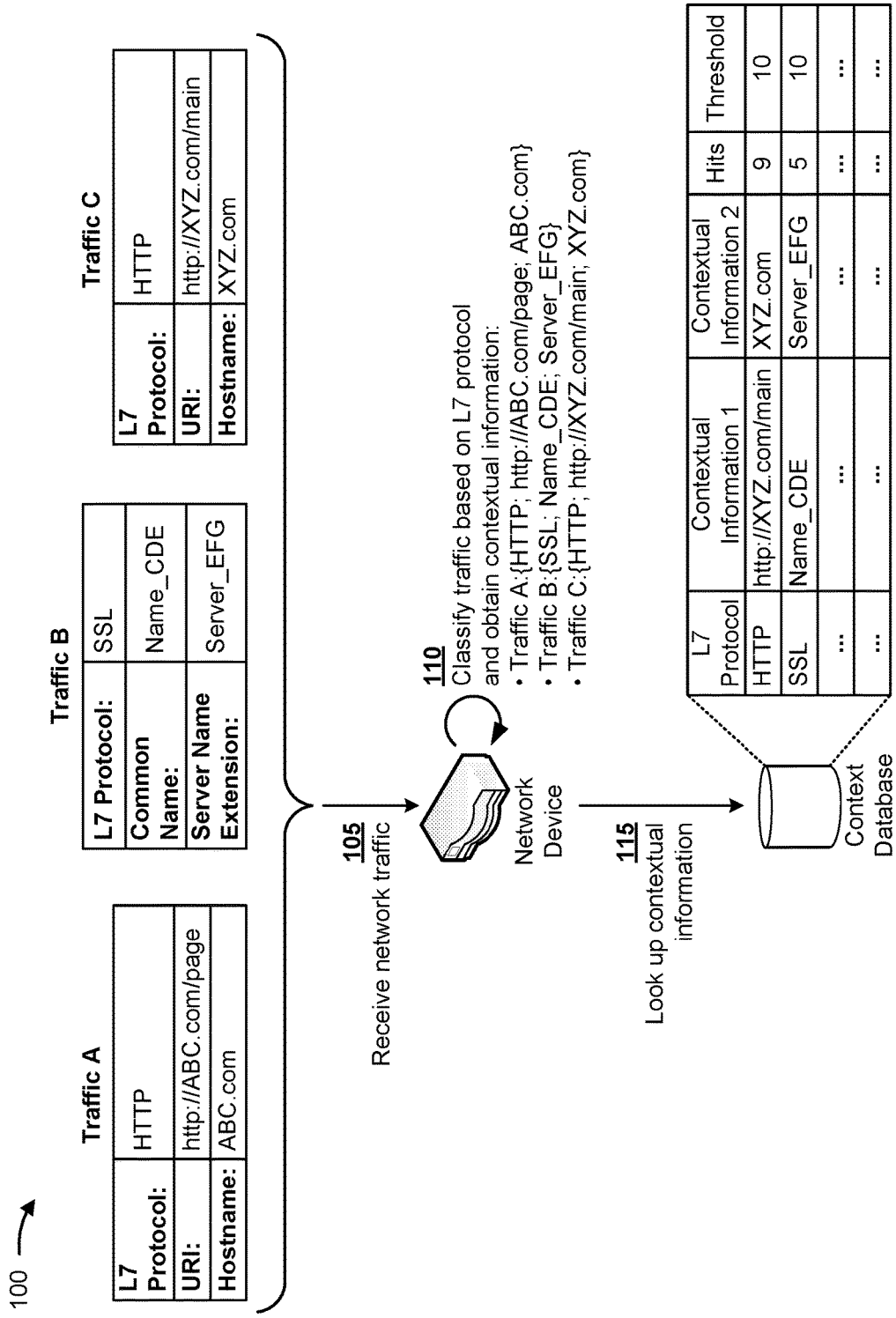
FIGS. 1A-1D are diagrams of an overview of an example implementation described herein.

FIGS. 1A-1D are diagrams of an overview of an example implementation 100 described herein. As shown in FIG. 1A, and by reference number 105, assume that a network device (e.g., a router, a gateway, or a firewall) is receiving network traffic that includes three traffic flows that may be associated with unknown applications (e.g., applications for which there may be no existing application signature). The first flow, shown as Traffic A, is using the HTTP L7 (e.g., application layer) protocol, with a requested uniform resource identifier (URI) of http://ABC.com/page, and a hostname of ABC.com. The second flow, shown as Traffic B, is using the SSL L7 protocol, with a common name for the server certificate of Name_CDE and a server name extension of Server_EFG. The third flow, shown as Traffic C, is using the HTTP L7 protocol, with a requested URI of http://XYZ.com/main, and a hostname of XYZ.com.

As shown by reference number 110, the network device may classify the network traffic based on an L7 protocol (e.g., HTTP, SSL) and may obtain two items of contextual information from the network traffic. The items of contextual information to be obtained from the network traffic may be determined based on a rule base associated with the traffic classification. For example, the network device may obtain the requested URI and the hostname from network traffic classified as HTTP (e.g., http://ABC.com/page and ABC.com for Traffic A, and http://XYZ.com/main and XYZ.com for Traffic C). The network device may obtain the common name for the server certificate and/or a server name extension from network traffic classified as SSL (e.g., Name_CDE and Server_EFG for Traffic B). As shown by reference number 115, the network device may look up, in a context database, the contextual information that was obtained from the network traffic. The context database may store, for each entry, the L7 protocol, two items of obtained contextual information, a hit counter, and a threshold (e.g., for use in determining whether to generate an application signature based on the network traffic).

Figure 1B:
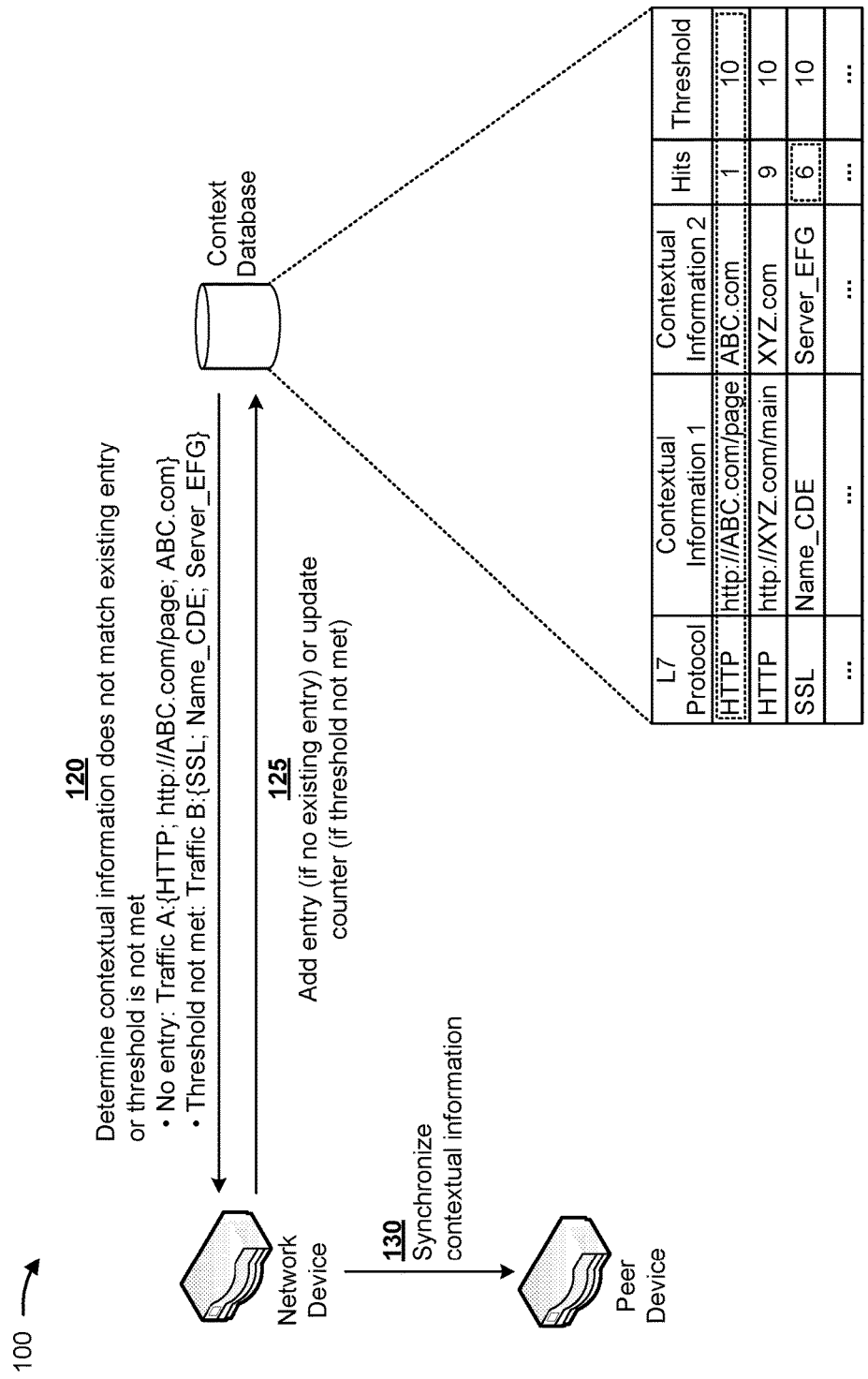

As shown in FIG. 1B, and by reference number 120, assume that the network device has determined that the contextual information obtained from Traffic A does not match an existing entry in the context database. As further shown by reference number 120, assume that the network device has determined that the contextual information obtained from Traffic B matches an existing entry in the context database, but the threshold has not been met. As shown by reference number 125, the network device may add an entry to the context database if there is no existing entry matching the obtained contextual information (e.g., for Traffic A). As shown by reference number 125, the network device may update the hit counter if there is an existing entry, but the threshold has been not met (e.g., for Traffic B, where the hit count has been incremented from 5 to 6, which is still below the threshold value of 10). As shown by reference number 130, the network device may send the obtained contextual information to a peer device to synchronize obtained contextual information between the network device and the peer device.

Figure 1C:
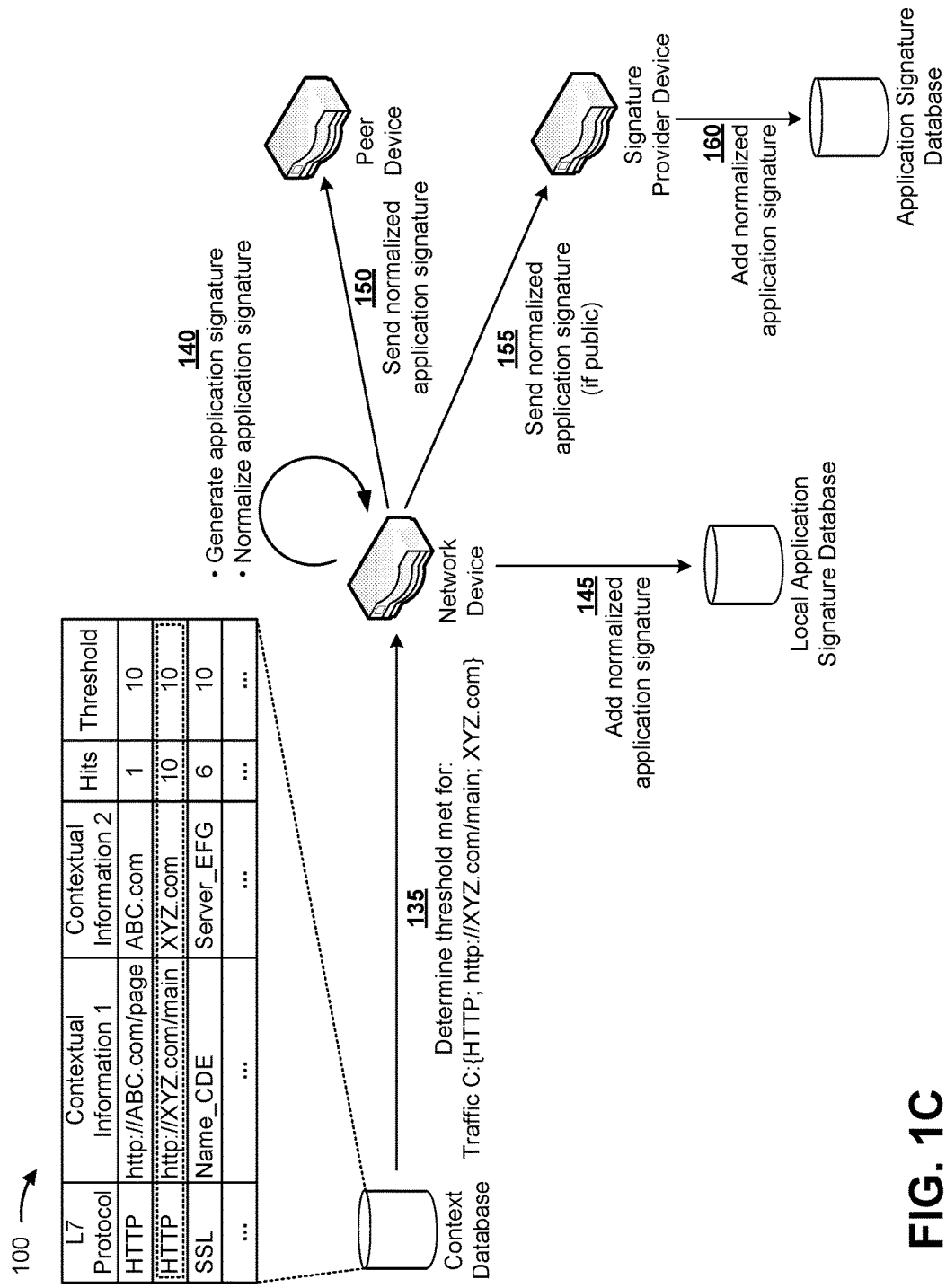

As shown in FIG. 1C, and by reference number 135, assume that the network device has determined that the contextual information obtained from Traffic C matches an existing entry in the context database and the threshold has been met (e.g., based on the additional hit corresponding to the contextual information obtained from Traffic C). As shown by reference number 140, the network device may generate an application signature based on the L7 protocol (e.g., HTTP) and the items of contextual information (e.g., the URI: http://XYZ.com/main and the Hostname: XYZ.com) that were obtained from Traffic C. As further shown by reference number 140, the network device may normalize the application signature.

As shown by reference number 145, the network device may add the normalized application signature to a local application signature database. As shown by reference number 150, the network device may send the normalized application signature to the peer device, which may use the application signature for application identification. As shown by reference number 155, if the application signature has been designated as public (e.g., the application signature is available for public distribution) the network device may send the normalized application signature to a signature provider device, which may use the application signature to support application identification. As shown by reference number 160, the signature provider device may add the normalized application signature to an application signature database.

Figure 1D:
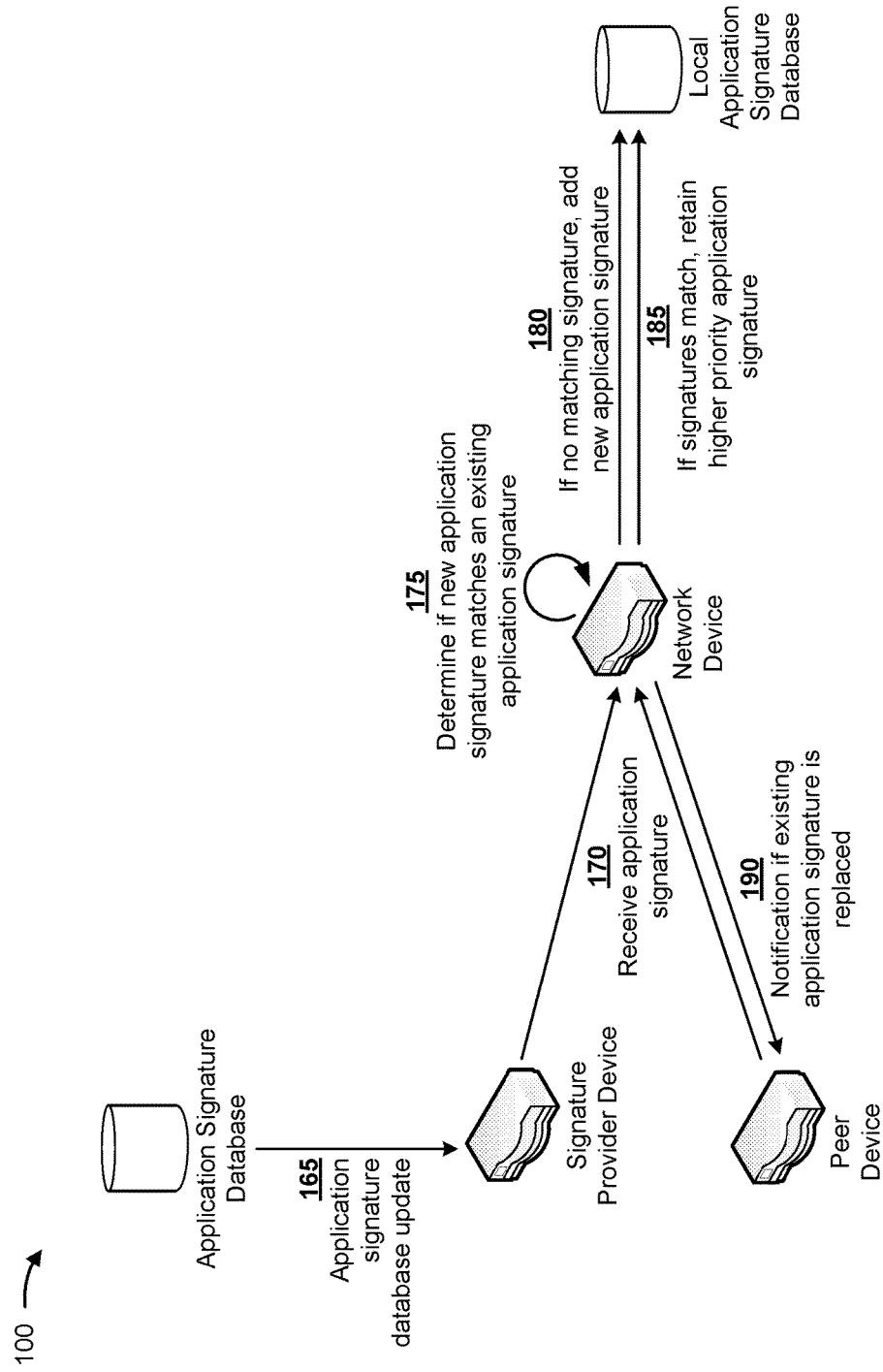

As shown in FIG. 1D, and by reference number 165, assume that the signature provider device has received an application signature database update. As shown by reference number 170, the network device may receive a new application signature from the signature provider device and/or the peer device.

As shown by reference number 175, the network device may determine if the new application signature matches an existing application signature (e.g., based on comparing hashes between normalized application signatures). As shown by reference number 180, if the network device determines that the new application signature does not match an existing application signature (e.g., based on finding no matching hash), the network device may add the new application signature to the local application signature database (e.g., in a new name space). As shown by reference number 185, if the network device determines that the new application signature matches an existing application signature (e.g., based on matching hashes between application signatures), the network device may determine a priority between the new application signature and the existing application signature. The network device may retain the higher priority application signature (new or existing) in the local application signature database, along with an application name from the higher priority application signature and/or any associated metadata (e.g., application group information for the application associated with the signature). As shown by reference number 190, the network device may send a notification to the peer device if an existing application signature is replaced (e.g., with a new application signature).

In this way, various network devices may automatically generate and distribute application signatures that are based on network traffic that is received by the network devices. Automatically generating and distributing application signatures amongst network devices may reduce delays associated with the generation and distribution of application signatures and may support identification of locally popular applications. Reducing delays associated with the generation and distribution of application signatures, and identifying locally popular applications, may improve the effectiveness of application-aware and/or application-based network security. Additionally, implementations described herein may enable the various network devices to automatically and selectively retain the automatically generated and distributed application signatures based on a suitable priority scheme. Selectively retaining the automatically generated and distributed application signatures based on a suitable priority scheme may allow the sets of application signatures retained by the various network devices to converge to a single common set of application signatures. Convergence to a single common set of application signatures may improve the effectiveness of application reporting and policy enforcement.

As indicated above, FIGS. 1A-1D are provided merely as an example. Other examples are possible and may differ from what was described with regard to FIGS. 1A-1D.

Figure 2:
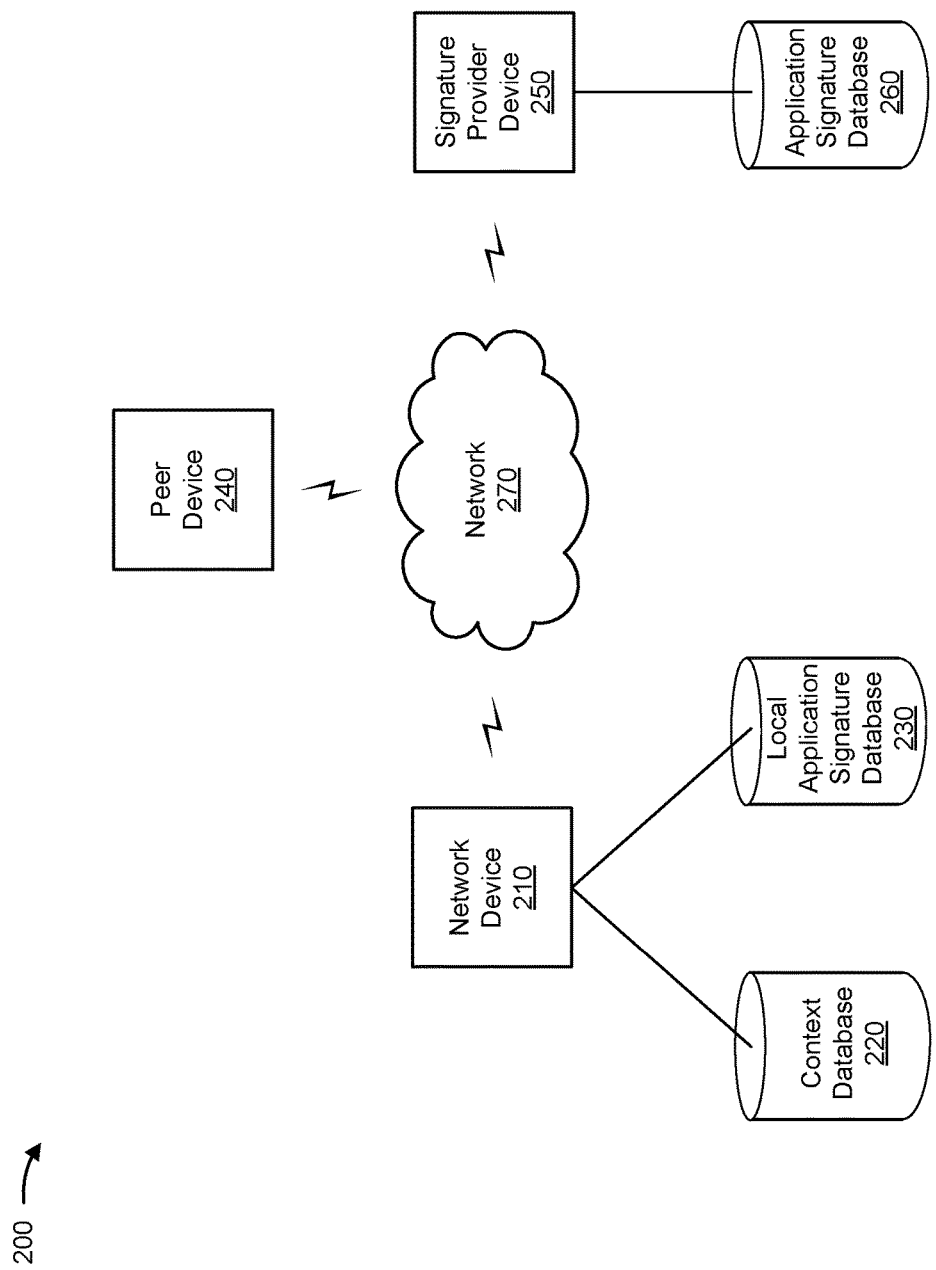
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a context database 220, a local application signature database 230, a peer device 240, a signature provider device 250, an application signature database 260, and a network 270. Devices of environment 200 may interconnect via wired connections, wireless connections, or a combination of wired and wireless connections.

Network device 210 includes one or more devices (e.g., one or more traffic transfer devices) capable of processing and/or transferring network traffic associated with endpoint devices. For example, network device 210 may include a router, a switch, a gateway, a firewall, a hub, a bridge, a reverse proxy device, a client device, a server device (e.g., a proxy server or a server executing a virtual machine), a security device, an intrusion detection device, a load balancer device, or a similar device. In some implementations, network device 210 may include an endpoint device that is capable of receiving and/or providing network traffic or that is a source or a destination for network traffic. For example, network device 210 may include a computer or a similar device. In some implementations, network device 210 may use context database 220 and/or local application signature database 230 to assist with obtaining contextual information from network traffic and with application signature generation and distribution. Network device 210 may transmit network traffic to and/or receive network traffic from peer device 240.

In some implementations, network device 210 may include a peer device tracking component. The peer device tracking component may authenticate peer devices (e.g., peer device 240) for network device 210, maintain a list of connected peer devices, and/or maintain a secure connection with a peer device for exchange of signature information. In some implementations, network device 210 may be administratively configured with identification information (e.g., an Internet protocol (IP) address) for one or more peer devices (e.g., peer device 240). In some implementations, network device 210 may discover and/or authenticate one or more peer devices (e.g., peer device 240) based on a discovery message, received by network device 210, from a peer device. In some implementations, the peer device tracking component may include a list of devices (e.g., peer device 240) that may be compatible with network device 210. In some implementations, peer device compatibility (e.g., between network device 210 and peer device 240) may be determined based on device characteristics or a version of an application signature database that may be active on network device 210 and/or peer device 240.

Context database 220 includes one or more devices capable of storing contextual information obtained from network traffic by network device 210. For example, context database 220 may include a memory device, a server device, a memory of network device 210, or the like. Network device 210 may use contextual information stored by context database 220 to assist with generating application signatures and/or identifying applications based on network traffic. Context database 220 may be local to or remote from network device 210. In some implementations, context database 220 may be a distributed entity that includes additional context databases, or components thereof, that are associated with one or more peer devices 240. In some implementations, context databases 220 associated with network device 210 and one or more peer devices 240 may periodically synchronize contextual information stored on the various context databases 220. In some implementations, context database 220 may store one or more rule bases that network device 210 may use to assist with obtaining contextual information from network traffic and application signature generation.

Local application signature database 230 includes one or more devices capable of storing application signatures. For example, local application signature database 230 may include a memory device, a server device, a memory of network device 210, or the like. Local application signature database 230 may be local to or remote from network device 210. Local application signature database 230 may store application signatures, which may include application signatures generated by network device 210 and application signatures received by network device 210 (e.g., from peer device 240 and/or signature provider device 250). Network device 210 may use one or more application signatures stored by local application signature database 230 to assist with identifying applications based on network traffic received, processed, and/or transferred by network device 210.

Peer device 240 includes one or more devices (e.g., one or more traffic transfer devices) capable of processing and/or transferring network traffic associated with endpoint devices. For example, peer device 240 may include a router, a switch, a gateway, a firewall, a hub, a bridge, a reverse proxy device, a client device, a server device (e.g., a proxy server, a server executing a virtual machine, etc.), a security device, an intrusion detection device, a load balancer device, or a similar device. In some implementations, peer device 240 may include an endpoint device that is capable of receiving and/or providing network traffic or that is a source or a destination for network traffic. For example, peer device 240 may include a computer or a similar device. In some implementations, peer device 240 may use a context database and/or a local application signature database to assist with application signature generation and distribution. Peer device 240 may transmit network traffic to and/or receive network traffic from network device 210. In some implementations, peer device 240 may be implemented as one or more devices of a cloud-computing network.

Signature provider device 250 includes one or more devices capable of receiving, generating, storing, processing, and/or providing application signatures. For example, signature provider device 250 may include a server, a storage device, or the like. In some implementations, signature provider device 250 may receive (e.g., from network device 210 and/or peer device 240) one or more application signatures generated by network device 210 and/or peer device 240. Signature provider device 250 may receive one or more application signatures generated by one or more DPI vendors. Signature provider device 250 may add, to application signature database 260, one or more application signatures received from network device 210, peer device 240, and/or one or more DPI vendors. Signature provider device 250 may send, to network device 210 and/or peer device 240, one or more application signatures stored by application signature database 260. In some implementations, signature provider device 250 may be implemented as one or more devices of a cloud-computing network. In some implementations, signature provider device 250 may provide public application signatures (e.g., application signatures available for public distribution) and/or restricted application signatures (e.g., application signatures that may have distribution limited to specified entities).

Application signature database 260 includes one or more devices capable of storing application signatures. For example, application signature database 260 may include a memory device, a server device, a memory of signature provider device 250, or the like. Application signature database 260 may be local to or remote from signature provider device 250. Application signature database 260 may store application signatures, which may include application signatures generated by network device 210, peer device 240, and/or one or more DPI vendors. In some implementations, the application signatures in application signature database 260 may be periodically updated and/or released by a DPI vendor. In some implementations, application signature database 260 may be implemented as one or more devices of a cloud-computing network. In some implementations, signature database 260 may store public application signatures (e.g., application signatures available for public distribution) and/or restricted application signatures (e.g., application signatures that may have distribution limited to specified entities). In some implementations, access to signature database 260 may be restricted to signature provider device 250.

Network 270 includes one or more wired and/or wireless networks. For example, network 270 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
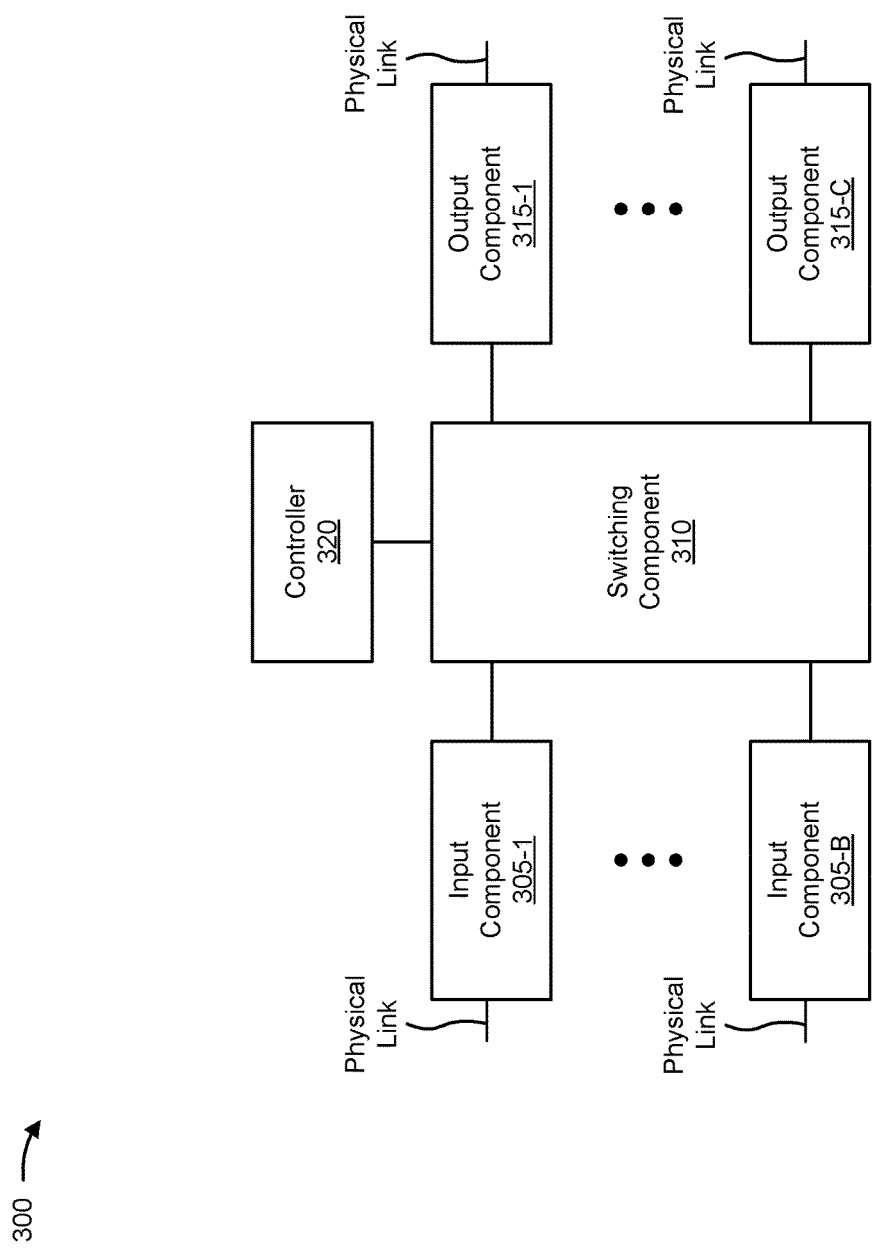
FIG. 3 is a diagram of example components of one or more devices of FIG. 2.

FIG. 3 is a diagram of example components of a device 300. Device 300 may correspond to network device 210, peer device 240, and/or signature provider device 250. In some implementations, network device 210, peer device 240, and/or signature provider device 250 may include one or more devices 300 and/or one or more components of device 300. As shown in FIG. 3, device 300 may include a set of input components 305, a switching component 310, a set of output components 315, and a controller 320. Components of device 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
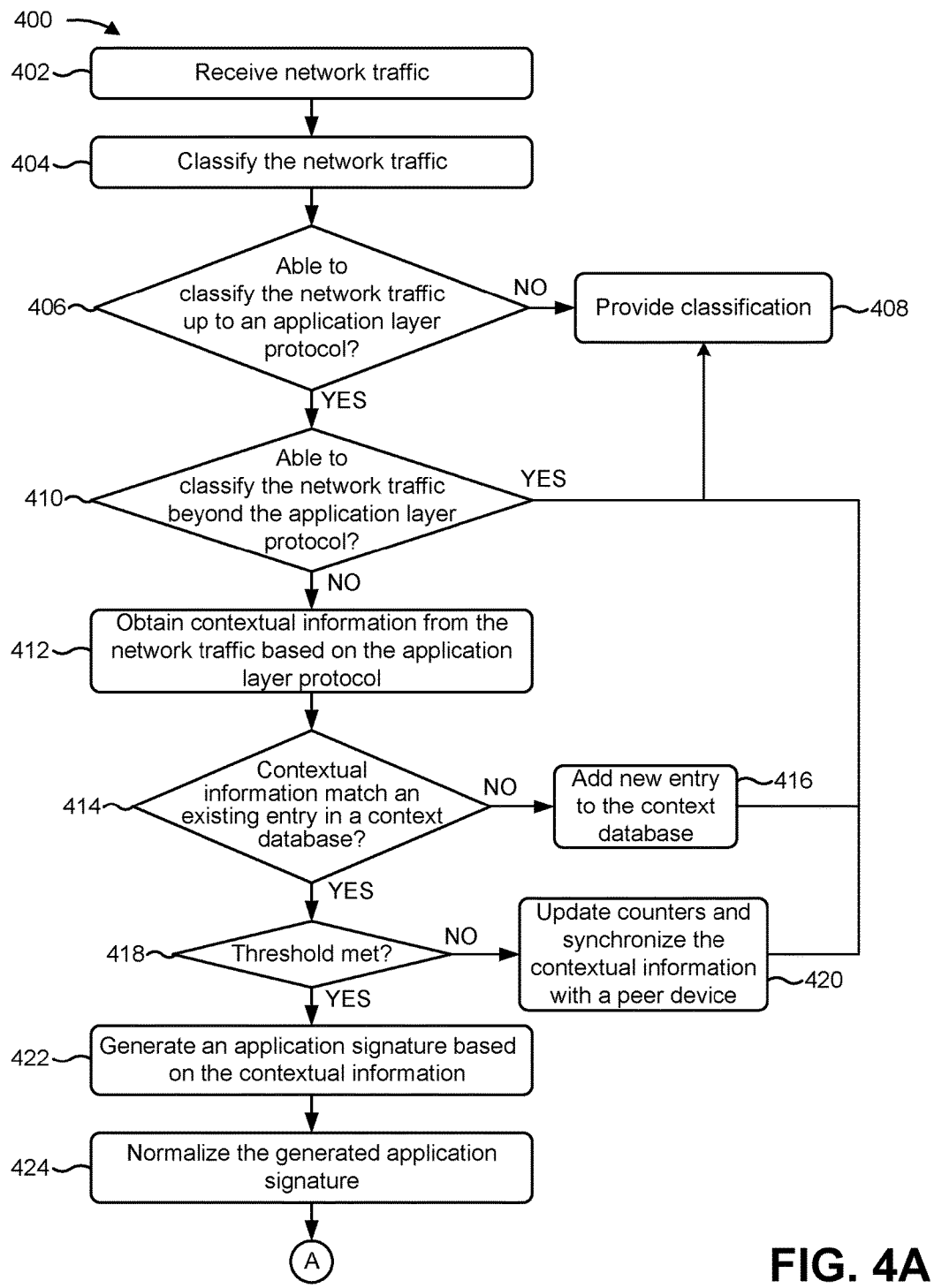
FIGS. 4A and 4B are flow charts of an example process for application signature generation and distribution.
Figure 4B:
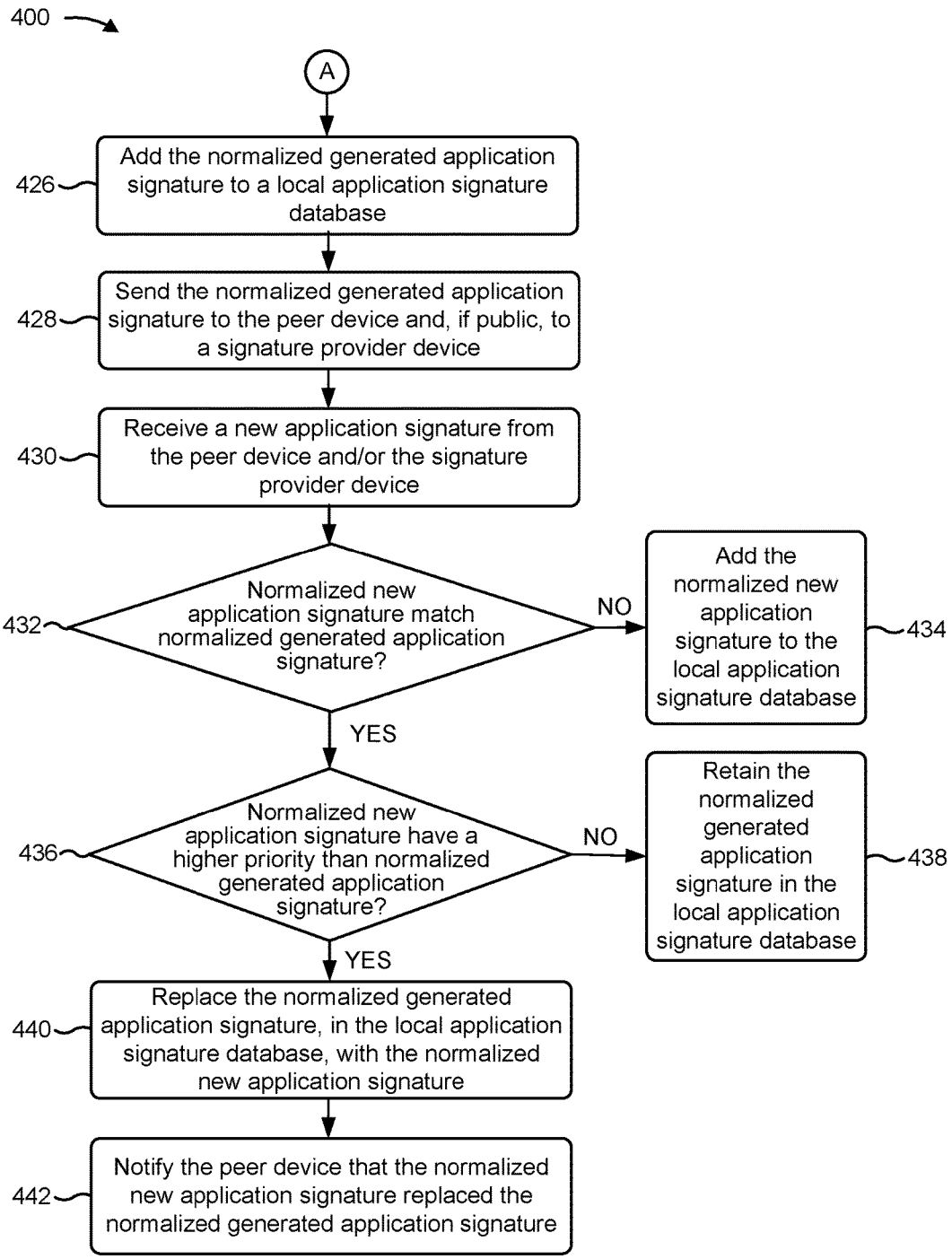

FIGS. 4A and 4B are flow charts of an example process 400 for application signature generation and distribution. In some implementations, one or more process blocks of FIGS. 4A and 4B may be performed by network device 210. In some implementations, one or more process blocks of FIG. 4 may be performed by another device or a group of devices separate from or including network device 210, such as context database 220, local application signature database 230, peer device 240, signature provider device 250, and/or application signature database 260.

As shown in FIG. 4A, process 400 may include receiving network traffic (block 402). For example, network device 210 may receive network traffic, which may correspond to one of more applications. As used herein, an application may refer to a software application (e.g., a web application) that operates at or above the application layer (e.g., at or above L7 of the OSI model) and in which the client (or user interface) may run in a web browser. Examples of applications may include webmail, online retail websites, online auctions, wiki websites, instant messaging services, web-based software office suites (e.g., online word processors, spreadsheets, and/or presentation programs), social networking websites, or the like.

The network traffic may include one or more data packets, each of which may include a header portion and a data portion (e.g., a payload). As used herein, a packet may refer to a communication structure for communicating information, such as a protocol data unit (PDU), a data packet, a frame, a datagram, a segment, a message, a block, a cell, a frame, a subframe, a slot, a symbol, a portion of any of the above, and/or another type of formatted or unformatted unit of data capable of being transmitted via a network.

As further shown in FIG. 4A, process 400 may include classifying the network traffic (block 404). For example, network device 210 may classify the network traffic based on examining the data packets of the network traffic. In some implementations, network device 210 may classify the network traffic based on examining the data portion (e.g., by deep packet inspection) and/or the header portion of the data packets.

In some implementations, network device 210 may attempt to classify the network traffic based on an application layer protocol (e.g., an L7 protocol, such as HTTP, SSL, etc.) being used for the network traffic. For example, network device 210 may attempt to identify the application layer protocol being used for the network traffic based on examining the data portion (e.g., by deep packet inspection) and/or the header portion of the data packets. Although the implementations described herein are generally described in the context of HTTP and/or SSL, network device 210 may classify network traffic based on any application layer protocol (e.g., file transfer protocol (FTP), simple mail transfer protocol (SMTP), etc.), including new and/or yet to be developed application layer protocols.

As further shown in FIG. 4A, process 400 may include determining whether the network traffic can be classified up to an application layer protocol (block 406). For example, network device 210 may determine whether the network traffic can be classified based on an application layer protocol (e.g., HTTP, SSL, etc.) being used for the network traffic. In some implementations, network device 210 may determine that the network traffic can be classified based on the application layer protocol that was identified as being used for the network traffic.

In some implementations, network device 210 may determine that the network traffic cannot be classified based on an application layer protocol, such as when network device 210 is unable to identify an application layer protocol being used for the network traffic. For example, network device 210 may be able to identify (e.g., based on examination of the data packets of the network traffic) a transport layer (e.g., OSI Layer 4 (L4)) protocol (e.g., transmission control protocol (TCP)) and a network layer (e.g., OSI Layer 3 (L3)) protocol (e.g., Internet protocol (IP)) being used for the network traffic, without being able to also determine an application layer (e.g., L7) protocol being used for the network traffic.

As further shown in FIG. 4A, if the network traffic cannot be classified up to an application layer protocol (block 406—NO), process 400 may include providing a classification (block 408). For example, network device 210 may provide a classification (e.g., based on examination of the data packets) if network device 210 cannot classify the network traffic based on an application layer protocol. In some implementations, network device 210 may provide the classification to the extent that network device 210 was able to classify the network traffic. For example, network device 210 may provide a classification path of IP:TCP for the network traffic when network device 210 was able to classify the network traffic based on the network layer (e.g., L3) protocol and the transport layer (e.g., L4) protocol (e.g., IP and TCP) that are being used for the network traffic, but not based on the application layer (e.g., L7) protocol.

As further shown in FIG. 4A, if the network traffic can be classified up to an application layer protocol (block 406—YES), process 400 may include determining whether the network traffic can be classified beyond the application layer protocol (block 410). For example, network device 210 may attempt to classify the network traffic beyond the application layer protocol being used for the network traffic.

In some implementations, network device 210 may be able to classify the network traffic beyond the application layer protocol being used for the network traffic. For example, network device 210 may classify the network traffic as being associated with a known application that operates over the application layer protocol (e.g., based on determining that the network traffic matches an application signature in local application signature database 230).

In some implementations, network device 210 may not be able to classify the network traffic beyond the application layer protocol being used for the network traffic. For example, network device 210 may classify the network traffic as being associated with an unknown application (e.g., based on determining that the network traffic does not satisfy an application signature in local application signature database 230).

As further shown in FIG. 4A, if the network traffic can be classified beyond the application layer protocol (block 410—YES), process 400 may include providing a classification (block 408). For example, if network device 210 determines that the network traffic is associated with an application named EXAMPLE, and the network traffic is using IP for a network layer (e.g., L3) protocol, TCP for a transport layer (e.g., L4) protocol, and HTTP for an application layer (e.g., L7) protocol, network device 210 may provide a classification path of IP:TCP:HTTP:EXAMPLE for the network traffic.

In some implementations, network device 210 may provide a classification path for the network traffic that network device 210 was not be able to classify beyond the application layer protocol being used for the network traffic. For example, if network device 210 determines that the network traffic is using IP for a network layer (e.g., L3) protocol, TCP for a transport layer (e.g., L4) protocol, and HTTP for an application layer (e.g., L7) protocol, but is not able to identify a known application associated with the network traffic, network device 210 may provide a classification path of IP:TCP:HTTP:UNKNOWN for the network traffic.

As further shown in FIG. 4A, if the network traffic cannot be classified beyond the application layer protocol (block 410—NO), process 400 may include obtaining contextual information from the network traffic based on the application layer protocol (block 412). For example, if network device 210 classifies the network traffic based on the application layer protocol being used for the network traffic, but is unable to further classify the network traffic, network device 210 may obtain contextual information from the network traffic based on the application layer protocol. Contextual information may include items of information associated with an application layer protocol that may be obtained from packets (e.g., via deep layer inspection) in the network traffic, and which may be used to identify an application that is associated with network traffic.

In some implementations, the particular items of contextual information to be obtained from the network traffic may be based on the application layer protocol (e.g., HTTP or SSL) that is being used for the network traffic. For example, network device 210 may be provided with at least one rule base associated with each of the application layer protocols for which the network device 210 is to classify network traffic. Each rule base may include information regarding the application layer protocol with which the rule base is to be used, items of contextual information to be obtained from network traffic, content and format of application signatures, a threshold for creation of an application signature, actions to be taken with regard to created application signatures, an application naming convention, or the like. In some implementations, network device 210 may determine whether a rule base is available to obtain contextual information based on a particular application layer protocol (e.g., HTTP or SSL). In some implementations, network device 210 may obtain a rule base from context database 220.

In some implementations, network device 210 may be provided with updated, additional, and/or new rule bases to enable obtaining contextual information from network traffic that is using additional and/or new application layer protocols. In some implementations, network device 210 may be provided with updated, additional, and/or new rule bases to enable obtaining contextual information from network traffic based on contextual information that is available for various application layer protocols, including application layer protocols for which network device 210 has previously been provided with a rule base. The updated, additional, and/or new rule bases may be created by a system administrator, by machine learning (e.g., by network device 210, by peer device 240, and/or by signature provider device 250), by analytics, or any other suitable method.

In some implementations, a rule base may specify contextual information to be obtained from network traffic that is using the HTTP application layer protocol. For example, contextual information that may be obtained from network traffic that is using the HTTP application layer protocol may include HTTP request details and HTTP response details like a URI that is being requested (HTTP_URI), a server hostname (HTTP_HOST), a cookie (HTTP_COOKIE), or the like. In some implementations, network device 210 may obtain the server hostname (HTTP_HOST) and the requested URI (HTTP_URI) from an HTTP request that is included in network traffic that is using the HTTP application layer protocol.

In some implementations, a rule base may specify contextual information to be obtained from network traffic that is using the SSL application layer protocol. For example, contextual information that may be obtained from network traffic that is using the SSL application layer protocol may include server certificate attributes, parameters from a client hello message (e.g., a ClientHello sent by a client to a server that the client is trying to connect with for a secure communication session), or the like. In some implementations, the parameters from the client hello message may include versions of the protocol (e.g., SSL) that the client supports, a list of suggested cipher suites, suggested compression methods, a server name extension for the server the client is trying to connect to, or the like. In some implementations, network device 210 may obtain a common name for the server certificate (e.g., if available in the certificate and not a wildcard value) and/or the server name extension (e.g., from the client hello message) from network traffic that is using the SSL application layer protocol.

As further shown in FIG. 4A, process 400 may include determining whether contextual information matches an existing entry in a context database (block 414). For example, network device 210 may look up, in context database 220, the contextual information that was obtained from the network traffic and determine whether the obtained contextual information matches an existing entry stored in context database 220.

In some implementations, network device 210 may look up the contextual information based on a rule base associated with the application layer protocol that is being used for the network traffic. For example, network device 210 may look up, in context database 220, the server hostname (HTTP_HOST) and the requested URI (HTTP_URI) that were obtained from network traffic that is using the HTTP application layer protocol. Alternatively, network device 210 may look up, in context database 220, the common name for the server certificate and/or the server name extension that were obtained from network traffic that is using the SSL application layer protocol.

In some implementations, network device 210 may normalize the obtained contextual information prior to looking up the obtained contextual information in context database 220. For example, network device 210 may use a suitable hash function to generate a hash on one or more items of the obtained contextual information and then compare the hash for the obtained contextual information to hash values in context database 220.

As further shown in FIG. 4A, if the contextual information does not match an existing entry in a context database (block 414—NO), process 400 may include adding a new entry to the context database (block 416). For example, if network device 210 determines that the contextual information does not match an existing entry in context database 220, network device 210 may add a new entry, based on the contextual information, to context database 220. In some implementations, entries in context database 220 may include various information regarding the network traffic. For example, entries in context database 220 may include an assigned name, various protocols being used for the network traffic (e.g., the network layer, transport layer, and application layer protocols), the items of contextual information that were obtained from the network traffic, a threshold for creation of an application signature (as will be described below), and threshold information (e.g., for evaluation against the threshold).

In some implementations, the items of contextual information that are included in entries in context database 220 may be normalized. For example, the entries in context database 220 may include a hash that was generated, using a suitable hash function, for one or more of the items of contextual information. Normalizing the stored contextual information may support comparison of contextual information that was obtained, from network traffic, by different devices (e.g., network device 210 and peer device 240).

In some implementations, network device 210 may assign names, to entries in context database 220, based on the application naming convention that is included in a rule base for the application layer protocol that is being used for the network traffic. For example, an entry based on contextual information obtained from network traffic that is using the HTTP application layer protocol may be based on a combination of the server hostname and a normalized value for the requested URI. Alternatively, an entry based on contextual information obtained from network traffic that is using the SSL application layer protocol may be based on a combination of the common name for the server certificate and the server name extension.

In some implementations, context database 220 may include metadata associated with the obtained contextual information. For example, context database 220 may include metadata such as a destination IP address, a destination port identifier, a virtual routing and forwarding (VRF) identifier, a logical system (LSYS) identifier, a virtual local area network (VLAN) identifier, a virtual extensible local area network (VXLAN) identifier, an application identifier, an application layer protocol identifier, a contextual information identifier, or the like. In some implementations, the metadata may be used to assist with looking up the obtained contextual information in context database 220. Looking up obtained contextual information, in context database 220, based on associated metadata, may enable distinguishing multiple entities referring to the same location. Distinguishing multiple entities referring to the same location may help identify a well-defined domain within which contextual information is to be looked up. Identifying a well-defined domain within which contextual information is to be looked up may avoid grouping similar, but distinct, network traffic and may provide more consistent classification of network traffic.

As further shown in FIG. 4A, when the contextual information does not match an existing entry in context database 220 (block 414—NO), process 400 may further include providing a classification (block 408). For example, when the contextual information does not match an existing entry in context database 220, network device 210 may classify the network traffic as being associated with a new unknown application. In some implementations, if the contextual information does not match an existing entry in context database 220, network device 210 may provide a classification path (e.g., IP:TCP:HTTP:UNKNOWN_NEW_TAG) to indicate that the network traffic includes previously unencountered contextual information that has not been associated with a known application.

As further shown in FIG. 4A, if the contextual information matches an existing entry in a context database (block 414—YES), process 400 may include determining whether a threshold is met (block 418). For example, network device 210 may determine whether a threshold has been met, with regard to the existing entry in context database 220, based on the contextual information obtained from the network traffic and/or threshold information in context database 220.

In some implementations, the threshold may be based on the information, included in a rule base for the application layer protocol that is being used for the network traffic, regarding a threshold for creation of an application signature. For example, the threshold, for an entry in context database 220, may be a hit count (e.g., a number of sessions to the same server with matching contextual information), a hit rate (e.g., a frequency of sessions to the same server with matching contextual information), a number of different source-destination pairs associated with the hits, a new session establishment rate, or the like. The threshold information may include one of more counters to track appropriate information (e.g., a number of hits, a hit rate, a number of different source-destination pairs, or a new session establishment rate) for comparison to the threshold.

In some implementations, the threshold may be used to determine when an application signature should be generated (e.g., after a finite number of matches, such as where multiple users may be accessing an application that may be becoming a well-known application). For example, the threshold may be used to indicate that an application might be of interest to a network operator such that an application signature (e.g., based on the contextual information obtained from the network traffic) should be generated for use in identifying the application.

In some implementations, entries in context database 220 may have more than one threshold. In some implementations, meeting at least one of the thresholds may be sufficient for generation of an application signature. In some implementations, meeting all of the thresholds may be necessary for generation of an application signature.

As further shown in FIG. 4A, if the threshold is not met (block 418—NO), process 400 may include updating counters and synchronizing the contextual information with a peer device (block 420). For example, if network device 210 determines that the threshold has not been met, network device 210 may update the appropriate counters in the threshold information for the appropriate entry in context database 220. Network device 210 may also send, to peer device 240, the contextual information obtained from the network traffic, which may synchronize contextual information, obtained by peer device 240, with the contextual information stored in context database 220 (e.g., with the contextual information obtained by network device 210).

As further shown in FIG. 4A, if the threshold is not met (block 418—NO), process 400 may further include providing a classification (block 408). For example, when the threshold is not met, network device 210 may classify the network traffic as being associated with an unknown, but previously encountered, application. In some implementations, if the contextual information matches an existing entry in context database 220, but the threshold has not been met for the existing entry, network device 210 may provide a classification path (e.g., IP:TCP:HTTP:UNKNOWN_TAGGED) to indicate that the network traffic includes previously encountered contextual information but does not correspond to a known application.

As further shown in FIG. 4A, if the threshold is met (block 418—YES), process 400 may include generating an application signature based on the contextual information (block 422). For example, when network device 210 determines that the threshold has been met for an entry in context database 220, network device 210 may generate an application signature based on the contextual information obtained from the network traffic and/or the matching contextual information from the entry in context database 220. In some implementations, the generated application signature may include the application layer protocol and at least one of the items of contextual information obtained from the network traffic. In some implementations, network device 210 may generate the application signature based on the information, included in a rule base for the application layer protocol being used for the network traffic, regarding the content and format of application signatures.

In some implementations, a rule base may specify the content and format of an application signature to be generated based on contextual information obtained from network traffic that is using the HTTP application layer protocol. For example, when the contextual information obtained from the network traffic includes a URI that is being requested and a server hostname, the generated application signature may include an application identification rule based on the application layer protocol (e.g., application layer=HTTP), along with application identification rules based on the requested URI (e.g., HTTP_URI=HTTP_URI value) and/or the server hostname (e.g., HTTP_HOST=HTTP_Host value). In some implementations, the generated application signature may include application identification rules based on the application layer protocol, the requested URI, and the server hostname (e.g., (application layer=HTTP) and (HTTP_URI=HTTP_URI value) and (HTTP_HOST=HTTP_Host value)). In some implementations, the generated application signature may include application identification rules based on the application layer protocol and the requested URI (e.g., (application layer=HTTP) and (HTTP_URI=HTTP_URI value)). In some implementations, the generated application signature may include application identification rules based on the application layer protocol and the server hostname (e.g., (application layer=HTTP) and (HTTP_HOST=HTTP_Host value)).

In some implementations, a rule base may specify the content and format of an application signature to be generated based on contextual information obtained from network traffic that is using the SSL application layer protocol. For example, when the contextual information obtained from network traffic that is using the SSL application layer protocol includes a common name for the server certificate and the server name extension, the generated application signature may include an application identification rule based on the application layer protocol (e.g., application layer=SSL), along with application identification rules based on the common name for the server certificate (e.g., Certificate_Name=Certificate_Name value) and/or the server name extension (e.g., Server_Name=Server_Name value). In some implementations, the generated application signature may include application identification rules based on the application layer protocol, the common name for the server certificate, and the server name extension (e.g., (application layer=SSL) and (Certificate_Name=Certificate_Name value) and (Server_Name=Server_Name value)). In some implementations, the generated application signature may include application identification rules based on the application layer protocol and the common name for the server certificate (e.g., (application layer=SSL) and (Certificate_Name=Certificate_Name value)). In some implementations, the generated application signature may include application identification rules based on the application layer protocol and the server name extension (e.g., (application layer=SSL) and (Server_Name=Server_Name value)).

In some implementations, the generated application signature may include an application name. In some implementations, the application name may be based on the application naming convention included in a rule base for the application layer protocol being used for the network traffic. In some implementations, the application name may be based on a server hostname (e.g., for traffic using HTTP for an application layer protocol) or a common name for a server certificate (e.g., for traffic using SSL for an application layer protocol).

In some implementations, network device 210 may provide a classification path for the network traffic that resulted in network device 210 generating an application signature and may identify an application based on the application signature. For example, if network device 210 generates an application signature based on contextual information obtained from network traffic that is using IP for an L3 protocol, TCP for an L4 protocol, HTTP for an application layer protocol, and XYZ for a server hostname (e.g., HTTP_HOST=XYZ), network device 210 may identify the application based on the application signature and provide, for the network traffic, an application name of XYZ (e.g., the server hostname) and a classification path of IP:TCP:HTTP:XYZ.

As further shown in FIG. 4A, process 400 may include normalizing the generated application signature (block 424). For example, network device 210 may normalize the generated application signature.

In some implementations, network device 210 may normalize the generated application signature using a suitable mapping function on the generated application signature.

For example, network device 210 may use a suitable hash function to generate a hash on the generated application signature. In some implementations, network device 210 may use a suitable hash function to generate a hash based on the application layer protocol, an item of contextual information used in the application signature, and a value for the item of contextual information used in the application signature (e.g., the hash may be generated on {HTTP, HTTP_HOST, HTTP_Host value}, {SSL, Certificate_Name, Certificate_Name value}, or the like).

In some implementations, the normalized generated application signature may include the generated application signature (e.g., the application identification rules) along with the application name, the hash on the generated application signature, signature generation information, signature type information, and/or an indication that the application signature is private or public. In some implementations, the signature generation information may indicate whether the application signature was generated locally (e.g., by network device 210) or was received from another device (e.g., peer device 240 or signature provider device 250). In some implementations, the signature type information may indicate whether the application signature is a new signature (e.g., to be added to local application signature database 230) or is an update signature (e.g., that should replace an application signature in local application signature database 230). Use of normalized generated application signatures based on a hash may enable comparison of application signatures generated, for the same application, by different devices (e.g., network device 210, peer device 240, or signature provider device 250), because the application signatures should have the same hash, even if the applications are named differently.

As shown in FIG. 4B, process 400 may include adding the normalized generated application signature to a local application signature database (block 426). For example, network device 210 may add the normalized generated application signature to local application signature database 230 (e.g., based on the information, included in a rule base for the application layer protocol being used for the network traffic, regarding actions to be taken with regard to created application signatures). In some implementations, the normalized generated application signature may be added to a new name space in local application signature database 230. In some implementations, network device 210 may additionally add, to local application signature database 230, the application name, from the normalized generated application signature, and/or associated metadata (e.g., application group information for the application associated with the signature).

As further shown in FIG. 4B, process 400 may include sending the normalized generated application signature to the peer device and, if public, to a signature provider device (block 428). For example, network device 210 may send the normalized generated application signature to peer device 240 and, if the normalized generated application signature is public (e.g., the application signature is available for public distribution), to signature provider device 250.

In some implementations, network device 210 may send the normalized generated application signature to peer device 240 based on the information, included in a rule base for the application layer protocol being used for the network traffic, regarding actions to be taken with regard to created application signatures. In some implementations, peer device 240 may update peer device 240's application signature information based on the normalized generated application signature received from network device 210, such that peer device 240 may use the application signature for application identification. In some implementations, network device 210 may send the normalized generated application signature to other peer devices (e.g., other security devices associated with network 270) that may be listed or identified in network device 210's peer device tracking component. Sending the normalized generated application signature to peer devices may support consistent application identification amongst security devices associated with network 270 (e.g., network device 210 and peer device 240).

In some implementations, when the normalized generated application signature is indicated to be public, network device 210 may send the normalized generated application signature to signature provider device 250. For example, network device 210 may send public normalized generated application signatures, to signature provider device 250, based on the information, included in a rule base for the application layer protocol being used for the network traffic, regarding actions to be taken with regard to created application signatures. In some implementations, network device 210 may send corresponding packet capture information (e.g., as obtained from the network traffic) in addition to the normalized generated application signature. In some implementations, network device 210 may disable sending normalized generated application signatures and/or the corresponding packet capture information to signature provider device 250. In some implementations, signature provider device 250 may use the application signature for application identification. In some implementations, signature provider device 250 may make the received normalized generated application signatures and/or the corresponding packet capture information available (e.g., to DPI vendors) for analysis and/or inclusion in future releases of an application signature database (e.g., application signature database 260).

As further shown in FIG. 4B, process 400 may include receiving a new application signature from the peer device and/or the signature provider device (block 430). For example, network device 210 may receive a new application signature from peer device 240 and/or signature provider device 250. In some implementations, a new application signature received from peer device 240 may have been generated by peer device 240. In some implementations, a new application signature may be received (e.g., from signature provider device 250 or peer device 240) based on an update to application signature database 260. For example, peer device 240 may send the new application signature to network device 210 based on peer device 240 having received the new application signature from signature provider device 250.

In some implementations, the new application signature may have been normalized by peer device 240 and/or signature provider device 250, such that network device 210 received a normalized new application signature. In some implementations, network device 210 may normalize the received application signature to generate a normalized new application signature. In some implementations, network device 210 may receive, along with the new application signature, an application name for the new application signature and/or associated metadata (e.g., application group information for the application associated with the signature).

As further shown in FIG. 4B, process 400 may include determining whether the normalized new application signature matches the normalized generated application signature (block 432). For example, network device 210 may determine whether a hash of the normalized new application signature (e.g., a hash included in the normalized new application signature) matches a hash of the normalized generated application signature (e.g., a hash included in the normalized generated application signature, as discussed above with regard to normalizing the generated application signature (block 424)). In some implementations, matching hashes of the normalized new application signature and the normalized generated application signature may indicate that both signatures are for the same application. In some implementations, the hash of the normalized new application signature may be a hash that was generated based on a public sample (e.g., of network traffic) that an application signature provider (e.g., a DPI vendor) may have received, and upon which the normalized new application signature may have been generated.

In some implementations, network device 210 may iterate through all application signatures in local application signature database 230, which may include all application signatures generated by network device 210, to determine whether a hash of the normalized new application signature matches a hash of any application signatures in local application signature database 230. For example, network device 210 may have previously received the new application signature (e.g., from peer device 240 and/or signature provider device 250). Alternatively, network device 210 may not have received an update indicating that a signature (e.g., in local application signature database 230) should have been removed or replaced.

As further shown in FIG. 4B, if the hash of the normalized new application signature does not match the hash of the normalized generated application signature (block 432—NO), process 400 may include adding the normalized new application signature to the local application signature database (block 434). For example, network device 210 may add the normalized new application signature to local application signature database 230 if the hash of the normalized new application signature does not match the hash of a normalized generated application signature. In some implementations, network device 210 may add the normalized new application signature to local application signature database 230 if the hash of the normalized new application signature does not match the hash of any application signature in local application signature database 230. In some implementations, network device 210 may additionally add, to local application signature database 230, an application name for the normalized new application signature and/or associated metadata (e.g., application group information).

As further shown in FIG. 4B, if the hash of the normalized new application signature matches the hash of the normalized generated application signature (block 432—YES), process 400 may include determining whether the normalized new application signature has a higher priority than the normalized generated application signature (block 436). For example, if the hash of the normalized new application signature matches the hash of the normalized generated application signature, network device 210 may determine, based on a suitable priority scheme, whether the normalized new application signature has a higher priority than the normalized generated application signature.

Determining priority between application signatures (e.g., between received new application signatures and signatures that were locally generated by network device 210) may enable the various security devices associated with network 270 (e.g., network device 210 and peer device 240) to converge to a single common set of application signatures. The single common set of application signatures may include a set of distinct signatures, with a single common set of application names, even though the application signatures in the set may have been generated by different devices (e.g., network device 210 or peer device 240), which may have different application naming conventions. Convergence to a single common set of application signatures, with a single common set of application names, may support consistent and efficient reporting of applications (e.g., based on the single common set of application names), as well as consistent and efficient policy enforcement, by the various security devices associated with network 270 (e.g., network device 210 and peer device 240).

In some implementations, a suitable priority scheme may include giving a highest priority to application signatures from application signature database 260. For example, signatures from application signature database 260, which may have been generated by a DPI vendor, may have a higher priority than signatures generated by network device 210.

In some implementations, application signatures generated by security devices associated with network 270 (e.g., network device 210 and peer device 240) may be assigned a priority based on an IP address associated with the device that generated the application signature. For example, signatures generated by a device (e.g., network device 210 or peer device 240) that has an IP address in a first range may be given a higher priority than signatures generated by a device (e.g., peer device 240 or network device 210) that has an IP address in a second range.

In some implementations, an application signature may include an attribute indicating that the application signature should be given a high priority. For example, an application signature may include an attribute indicating that the application signature was included in a newly released update to application signature database 260.

As further shown in FIG. 4B, if the normalized new application signature does not have a higher priority than the normalized generated application signature (block 436—NO), process 400 may include retaining the normalized generated application signature in the local application signature database (block 438). For example, network device 210 may retain the normalized generated application signature, the application name from the normalized generated application signature, and/or any associated metadata (e.g., application group information) in local application signature database 230 when the normalized new application signature does not have a higher priority than the normalized generated application signature that has the same hash as the normalized new application signature.

As further shown in FIG. 4B, if the normalized new application signature has a higher priority than the normalized generated application signature (block 436—YES), process 400 may include replacing the normalized generated application signature, in the local application signature database, with the normalized new application signature (block 440). For example, network device 210 may replace the normalized generated application signature, in local application signature database 230, with the normalized new application signature, when the normalized new application signature has a higher priority than the normalized generated application signature that has the same hash as the normalized new application signature. In some implementations, when the normalized new application signature has a higher priority, network device 210 may additionally replace, in local application signature database 230, the application name for the normalized generated application signature and/or any associated metadata with the application name for the normalized new application signature and/or any associated metadata.

As further shown in FIG. 4B, process 400 may include notifying the peer device that the normalized new application signature replaced the normalized generated application signature (block 442). For example, network device 210 may notify peer device 240 when network device 210 has replaced a normalized generated application signature (e.g., with a normalized new application signature that was received by network device 210). In some implementations, receiving notification that network device 210 has replaced a normalized generated application signature may cause peer device 240 to remove peer device 240's local entry for the normalized generated application signature and/or replace peer device 240's local entry for the normalized generated application signature with the normalized new application signature. Removing or replacing peer device 240's local entry for the normalized generated application signature may support consistency between application signatures used by peer device 240 and network device 210, even when peer device 240 and network device 210 receive updates from signature provider device at different times.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Implementations described herein may allow automated generation, distribution, and convergence of application signatures, by and amongst network devices, based on network traffic being received by the network devices. Automated generation, distribution, and convergence of application signatures may reduce delays associated with the generation, distribution, and convergence of application signatures and may support identification of locally popular applications. Reducing delays associated with the generation and distribution of application signatures, identifying locally popular applications, and automating convergence of application signatures may improve the effectiveness of application-aware and/or application-based network security. Improving the effectiveness of application-aware and/or application-based network security may accelerate elimination of rogue traffic and/or identification of legitimate traffic. Eliminating rogue traffic may improve network security, conserve computing resources (e.g., processing resources and/or memory resources that might otherwise be consumed by the rogue traffic), and increase network performance (e.g., throughput and/or latency) due to the elimination of the rogue traffic from the network. Accelerating identification of legitimate traffic may conserve computing resources (e.g., processing resources and/or memory resources that might otherwise be consumed identifying the legitimate traffic) and may increase network performance for the legitimate traffic (e.g., throughput and/or latency) due to the reduced time to identify the legitimate traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
a memory; and
one or more processors to:
receive network traffic for an application;
identify an application layer protocol being used for the network traffic,
the application layer protocol being a secure protocol;
obtain contextual information, from the network traffic, to obtain an item of contextual information,
the item of contextual information being selected based on the application layer protocol;
determine that the item of contextual information matches a stored item of contextual information,
the item of contextual information including at least one of:
a server hostname,
a uniform resource identifier (URI) that is being requested,
a common name for a server certificate, or
a server name extension from a client hello message;
identify a hit count corresponding to the stored item of contextual information;
determine that the hit count satisfies a threshold with regard to the stored item of contextual information;
generate, after determining that the hit count satisfies the threshold, an application signature for the application based on the item of contextual information; and send the application signature to another device to permit the other device to identify the application based on the application signature.

2. The network device of claim 1,
where the one or more processors are further to:
determine, before sending the application signature to the other device, whether the application signature is public; and
where the one or more processors, when sending the application signature to the other device, are to:
selectively send the application signature to the other device based on whether the application signature is public.

3. The network device of claim 1,
where the application signature is a first application signature; and
where the one or more processors are further to:
receive, from the other device, a second application signature;
determine whether the second application signature corresponds to the first application signature; and
selectively store both the first application signature and the second application signature when the second application signature does not correspond to the first application signature; or
when the second application signature corresponds to the first application signature,
selectively determine a higher priority one of the first application signature and the second application signature, and
selectively store the higher priority one of the first application signature and the second application signature.

4. The network device of claim 3,
where the one or more processors are further to:
generate, before determining whether the second application signature corresponds to the first application signature, a first hash based on the first application signature and a second hash based on the second application signature; and
where the one or more processors, when determining whether the second application signature corresponds to the first application signature, are to:
determine whether the first hash matches the second hash.

5. The network device of claim 1, where the one or more processors are further to:
send, to the other device, the contextual information.

6. The network device of claim 1,
where the application layer protocol is further a hypertext transfer protocol (HTTP); and
where the application signature is based on at least one of the server hostname or the URI that is being requested.

7. The network device of claim 1, where the application signature is based on at least one of the common name for the server certificate or the server name extension.

8. A non-transitory computer-readable medium storing instructions, the instructions comprising:
one or more instructions that, when executed by one or more processors, cause the one or more processors to:
receive network traffic associated with an application;
determine, from the network traffic, an application layer protocol being used for the network traffic, the application layer protocol being a secure protocol;
obtain, from the network traffic, an item of contextual information,
the item of contextual information being associated with the application layer protocol;
determine that the item of contextual information matches a stored item of contextual information,
the item of contextual information including at least one of:
a server hostname,
a uniform resource identifier (URI) that is being requested,
a common name for a server certificate, or
a server name extension from a client hello message;
identify a hit count corresponding to the stored item of contextual information;
determine that the hit count satisfies a threshold with regard to the stored item of contextual information;
generate, after determining that the hit count satisfies the threshold, an application signature for the application based on the stored item of contextual information; and
send the application signature to another device to permit the other device to identify the application based on the application signature.

9. The non-transitory computer-readable medium of claim 8,
where the one or more instructions, when executed by the one or more processors, further cause the one or more processors to:
generate, before sending the application signature to the other device, a normalized application signature, the normalized application signature including a hash generated based on the stored item of contextual information; and
where the one or more instructions, that cause the one or more processors to send the application signature to the other device, cause the one or more processors to:
send the normalized application signature to the other device.

10. The non-transitory computer-readable medium of claim 8,
where the one or more instructions, when executed by the one or more processors, further cause the one or more processors to:
determine, before sending the application signature to the other device, whether the application signature is public; and
where the one or more instructions, that cause the one or more processors to send the application signature to the other device, cause the one or more processors to:
selectively send the application signature to the other device based on whether the application signature is public.

11. The non-transitory computer-readable medium of claim 8,
where the application signature is a first application signature; and
where the one or more instructions, when executed by the one or more processors, further cause the one or more processors to:
store the first application signature;
receive a second application signature;
determine whether the second application signature corresponds to the first application signature; and
selectively store the second application signature when the second application signature does not correspond to the first application signature; or when the second application signature corresponds to the first application signature,
selectively determine a higher priority one of the first application signature and the second application signature, and
selectively replace the first application signature with the second application signature when the higher priority one, of the first application signature and the second application signature, is the second application signature.

12. The non-transitory computer-readable medium of claim 11,
where the one or more instructions, when executed by the one or more processors, further cause the one or more processors to:
generate, before determining whether the second application signature corresponds to the first application signature, a first hash based on the first application signature and a second hash based on the second application signature; and
where the one or more instructions, that cause the one or more processors to determine whether the second application signature corresponds to the first application signature, cause the one or more processors to:
determine whether the first hash matches the second hash.

13. The non-transitory computer-readable medium of claim 8,
where the application layer protocol is further a hypertext transfer protocol (HTTP); and
where the application signature is based on at least one of the server hostname or the URI that is being requested.

14. The non-transitory computer-readable medium of claim 8, where the application signature is based on at least one of the common name for the server certificate or the server name extension.

15. A method, comprising:
receiving, by a network device, network traffic,
the network traffic corresponding to an application;
identifying, by the network device, an application layer protocol being used for the network traffic,
the application layer protocol being a secure protocol;
obtaining, by the network device and from the network traffic, an item of contextual information,
the item of contextual information being selected based on the application layer protocol;
determining, by the network device, that the item of contextual information matches a stored item of contextual information,
the item of contextual information including at least one of:
a server hostname,
a uniform resource identifier (URI) that is being requested,
a common name for a server certificate, or
a server name extension from a client hello message;
identifying, by the network device, a hit count corresponding to the stored item of contextual information;
determining, by the network device, that the hit count satisfies a threshold with regard to the stored item of contextual information;
generating, by the network device and after determining that the hit count satisfies the threshold, an application signature for the application based on the item of contextual information; and
sending, by the network device, the application signature to another device to permit the other device to identify the application based on the application signature.

16. The method of claim 15, further comprising:
determining, before sending the application signature to the other device, whether the application signature is public; and
where sending the application signature to the other device comprises:
selectively sending the application signature to the other device based on whether the application signature is public.

17. The method of claim 15, where
the application signature is a first application signature; and
the method further comprises:
receiving a second application signature;
generating a first hash based on the first application signature and a second hash based on the second application signature;
determining whether the first hash matches the second hash; and
selectively storing both the first application signature and the second application signature when the first hash does not match the second hash; or
when the first hash matches the second hash,
selectively determining a higher priority one of the first application signature and the second application signature, and
selectively storing the higher priority one of the first application signature and the second application signature.

18. The method of claim 15, further comprising:
generating, before sending the application signature to the other device, a normalized application signature,
the normalized application signature including a hash generated based on the item of contextual information; and
where sending the application signature to the other device comprises:
sending the normalized application signature to the other device.

19. The method of claim 15,
where the application layer protocol is further a hypertext transfer protocol (HTTP); and
where the application signature is based on at least one of the server hostname or the URI that is being requested.

20. The method of claim 15, where the application signature is based on at least one of the common name for the server certificate or the server name extension.

* * * * *